(12) United States Patent
Moskowitz et al.

(10) Patent No.: US 6,483,433 B2
(45) Date of Patent: Nov. 19, 2002

(54) METHOD AND APPARATUS FOR NOTIFYING OF RECEIPT

(75) Inventors: Paul A. Moskowitz, Yorktown Heights, NY (US); Clifford A. Pickover, Yorktown Heights, NY (US); Stephen J. Boies, Mahopac, NY (US); William Grey, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/788,940

(22) Filed: Feb. 20, 2001

(65) Prior Publication Data

US 2002/0113703 A1 Aug. 22, 2002

(51) Int. Cl.$^7$ ............................................... G08B 13/14
(52) U.S. Cl. ........................ 340/568.1; 340/569; 232/34
(58) Field of Search ............................ 340/568.1, 569, 340/527, 539; 232/17, 34

(56) References Cited

U.S. PATENT DOCUMENTS

| | | | | |
|---|---|---|---|---|
| 4,154,393 A | * | 5/1979 | Darvishian | 232/36 |
| 4,291,342 A | * | 9/1981 | O'Connor | 360/12 |
| 5,023,595 A | * | 6/1991 | Bennett | 340/569 |
| 5,036,310 A | * | 7/1991 | Russell | 340/569 |
| 5,901,204 A | * | 5/1999 | Gallacher et al. | 379/90.01 |
| 5,917,411 A | * | 6/1999 | Baggarly | 340/569 |
| 5,950,919 A | * | 9/1999 | Adams | 232/34 |
| 6,028,517 A | * | 2/2000 | Sansone et al. | 340/569 |
| 6,114,959 A | * | 9/2000 | Bennett | 340/569 |
| 6,323,782 B1 | * | 11/2001 | Stephens et al. | 340/825.31 |

* cited by examiner

*Primary Examiner*—John Tweel
(74) *Attorney, Agent, or Firm*—Buckley, Maschoff, Talwalkar & Allison LLC; Stephen C. Kaufman

(57) ABSTRACT

A system, method, apparatus, and computer program code for notifying at least one entity upon receipt of an item is provided. According to embodiments of the present invention, a determination is made whether an item has been placed in a repository. This determination may be made using any of a number of different types and combinations of sensors. An identification of at least one entity to be notified is then made, and the entity is notified if a determination is made that an item has been placed in the repository.

6 Claims, 4 Drawing Sheets

METHOD AND APPARATUS FOR NOTIFYING OF RECEIPT

FIELD OF THE INVENTION

The present invention relates to a notification system. More particularly, embodiments of the present invention relate to methods, apparatus, and computer program code for detecting the presence of items dropped off in repositories such as mail boxes and notifying entities of the presence.

BACKGROUND OF THE INVENTION

Modern life is hectic. People are working longer hours, spending more time in traffic, and generally have a desire to simplify their lives by minimizing the amount of time wasted on errands. One common errand is picking up mail and other delivery items. For many-people, this is a minor, and even enjoyable activity. For others, however, it is a distraction and a drain on time, especially where the person is located a distance away from his or her mailbox or delivery location. For example, many people use mailboxes which are located a long distance from their home or office. A small business, for example, may use a Post Office box located miles away from the small business. Individuals in rural areas may have a mailbox that is located hundreds of yards, if not miles, from their home. It can be frustrating and a waste of time for these individuals to make a trip to the mailbox only to find that the mail has not yet arrived or that they received no mail.

People often receive valuable deliveries, including package deliveries, at home during the daytime when they are far away in their office and unable to confirm receipt of the delivery. Frequently, packages are simply left on the doorstep or with a neighbor. The zBox Company of San Francisco, Calif., has developed a secure delivery box (the "zBox") which allows secure delivery of packages and other items when the recipient is not available to accept the package. The zBox does not, however, provide any ability to notify an individual that a package has arrived.

It would be advantageous to provide a method and apparatus that overcame the drawbacks of the prior art. In particular, it would be desirable to provide an ability to notify people when they have received a delivery, thereby eliminating unnecessary trips to the mailbox or other delivery locations. It would also be desirable to provide an ability to confirm delivery of items, even when the recipient does not directly receive and sign for the package. It would also be desirable to provide a mechanism to confirm the identity of an individual or entity making a delivery.

SUMMARY OF THE INVENTION

Embodiments of the present invention provide a system, method, apparatus, and computer program code for notifying at least one entity upon receipt of an item. According to embodiments of the present invention, a determination is made whether an item has been placed in a repository. This determination may be made using any of a number of different types and combinations of sensors. An identification of at least one entity to be notified is made, and the entity is notified if a determination is made that an item has been placed in the repository.

According to one embodiment of the present invention, a determination of whether to grant access to the repository is made before the item is placed within the repository.

According to one embodiment of the present invention, at least one characteristic of the item is identified. For example, a sensor may be used to detect a characteristic of the item (e.g., the item's weight, shape, identity, etc.).

With these and other advantages and features of the invention that will become hereinafter apparent, the nature of the invention may be more clearly understood by reference to the following detailed description of the invention, the appended claims and to the several drawings attached herein.

DETAILED DESCRIPTION

Applicants have recognized that there is a need for systems and methods which allow recipients of items to be notified once the item has been delivered. In addition, Applicants have recognized that there is a need to provide an ability to identify items delivered and forward the identity information to the recipient. Further, Applicants have recognized that there is a need to provide an ability to verify the identity of an individual or entity delivering the item. Embodiments of the present invention provide such capabilities, by providing sensor devices in delivery repositories (such as mailboxes) and communication devices which notify individuals when a delivery has been made. According to embodiments of the invention, sensors may also be used to identify the type or content of items delivered and forward that information to the recipient. Further, embodiments of the present invention include access control devices which prevent unauthorized access to delivery repositories. These and other features will be discussed in further detail below, by describing a system, individual devices, and processes according to embodiments of the invention.

System

Figure 1:
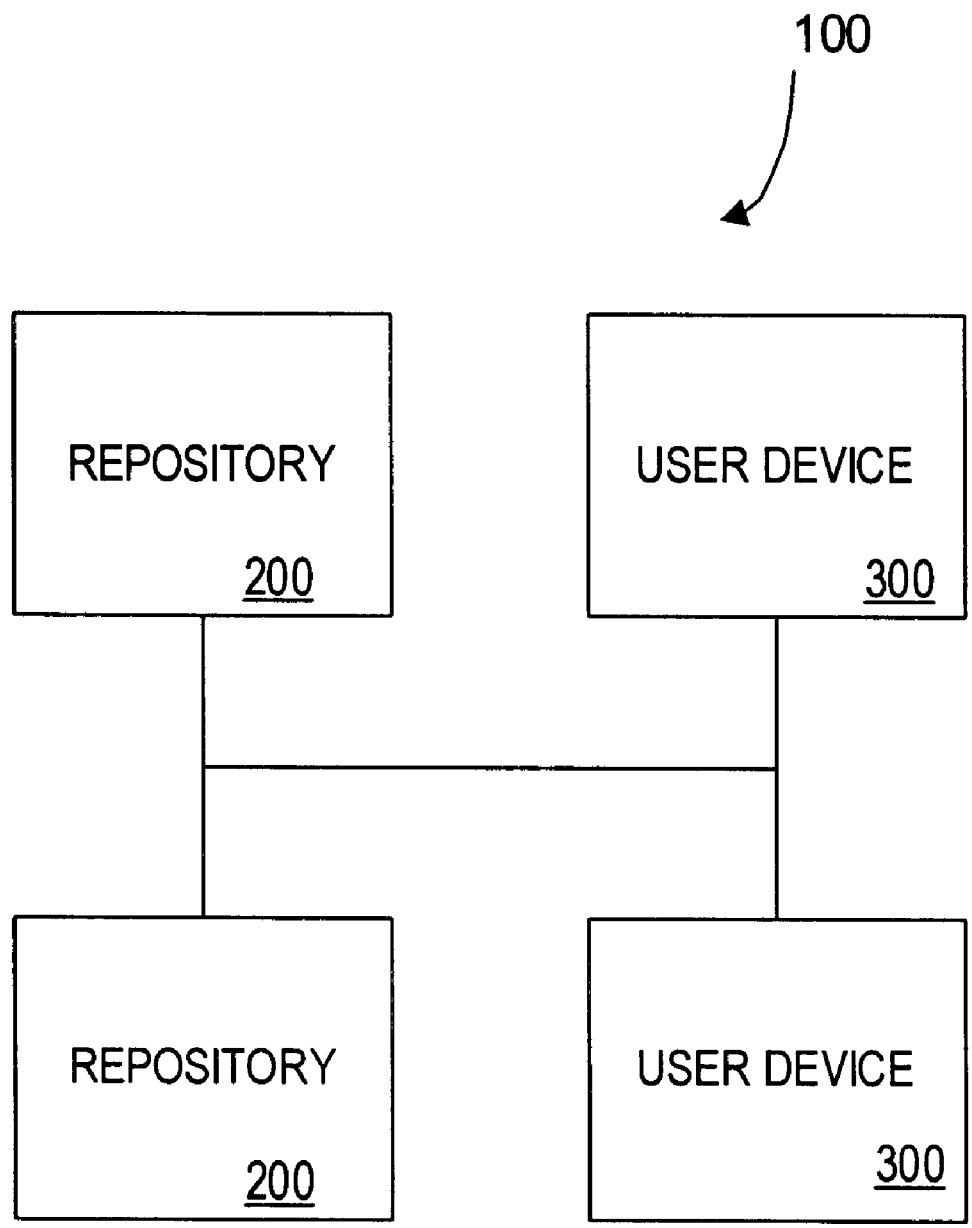
FIG. 1 is a block diagram of a system consistent with the present invention.

Turning now in detail to the drawings, FIG. 1 is a block diagram of a notification system 100 according to one embodiment of the present invention. Notification system 100 includes a number of repositories 200 in communication with a number of user devices 300. As will be described in further detail below, repository 200 may include a container portion (such as a mailbox or lock box) and electronics which functions to detect the deposit of items into the container portion. Repository 200 may also include electronics to control access to the container.

User device 300 may be any of a number of different types of devices used by any of a number of different types of users. For example, user device 300 may be a computer operated by the recipient of the delivered item deposited into repository 200 (e.g., a small business owner who utilizes embodiments of the present invention to be alerted when mail or packages are deposited into his mailbox). User device 300 may also be a computer operated by the entity who sent the item (e.g., a mail order company or Internet retailer) who utilizes embodiments of the present invention to be informed when the item has been delivered to the intended recipient. User device 300 may also be a computer operated by the entity making the delivery (e.g., the U.S.

Post Office, Federal Express®, etc.). Those skilled in the art, upon reading this disclosure, will recognize that other entities may operate user devices 300 to take advantage of features of embodiments of the present invention as well.

As used herein, devices (such as repository 200 and user device 300) may communicate in a number of way, including, for example, via a communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless network, a cable television network, or an Internet Protocol (IP) network such as the Internet, an intranet or an extranet. Moreover, as used herein, communications include those enabled by wired or wireless technology.

In one embodiment, a suitable wireless communication network includes the use of Bluetooth technology, allowing a wide range of computing and telecommunication devices to be interconnected via wireless connections. Specifications and other information regarding Bluetooth technology are available at the Bluetooth Internet site www.bluetooth.com. In embodiments utilizing Bluetooth technology, some or all of the devices of FIG. 1 may be equipped with a microchip tranceiver that transmits and receives in a previously unused frequency band of 2.45 GHz that is available globally (with some variation of bandwidth in different countries). In addition to data, up to three voice channels are available. Connections can be point-to-point or multipoint over a current maximum range of ten (10) meters. Embodiments using Bluetooth technology may require the additional use of one or more receiving stations to receive and forward data from individual repositories 200 (e.g., a Bluetooth receiving device may be positioned near a row of mailboxes each equipped with Bluetooth transmitters, and the Bluetooth receiving device may relay information from each of the mailboxes to and from a wired or wireless network to user devices 300).

In one embodiment of the present invention, a repository 200 may communicate with one or more remote, Web-based user devices 300 via the Internet (e.g., notice of delivery may be sent via the Internet to a user device 300 operated by the recipient of the item, a user device 300 operated by the entity sending the item, and/or a user device 300 operated by the entity making the delivery). In one embodiment of the present invention, repository 200 may transmit information to a central Web based user device 300 acting as a Webserver which can then be accessed by various entities wishing to check on the status of repository 200. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

Repository 200 and user device 300 may be formed of any devices capable of performing the various functions described herein. Repository 200 or user device 300 may be, for example: a Personal Computer (PC), a portable computing device such as a Personal Digital Assistant (PDA), a wired or wireless telephone, a one-way or two-way pager, a kiosk (e.g., a user kiosk located at an airport terminal), an interactive television device, or any other appropriate storage and/or communication device.

Note that although two repositories 200 and two user devices 300 are shown in FIG. 1, any number of such devices may be included in notification system 100. The devices shown in FIG. 1 need not be in constant communication. For example, repository 200 may only communicate with user device 300 when appropriate (e.g., when a sensor in repository 200 determines that an item has been delivered, or on a predetermined schedule to provide user with an updated status of the contents or lack of contents of repository).

Devices

1. Repository

Figure 2:
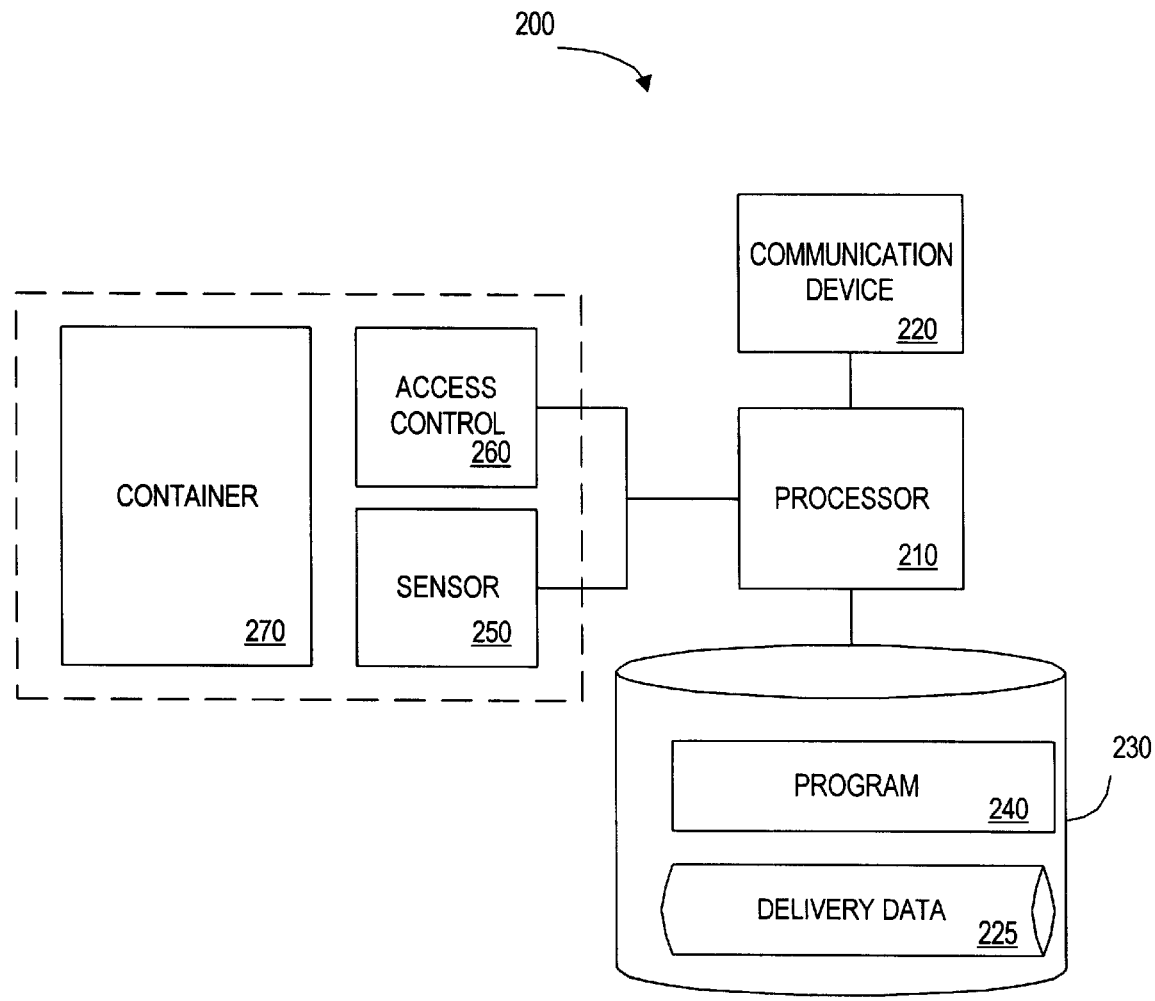
FIG. 2 is a block diagram of one embodiment of the repository depicted in FIG. 1.
Figure 3:
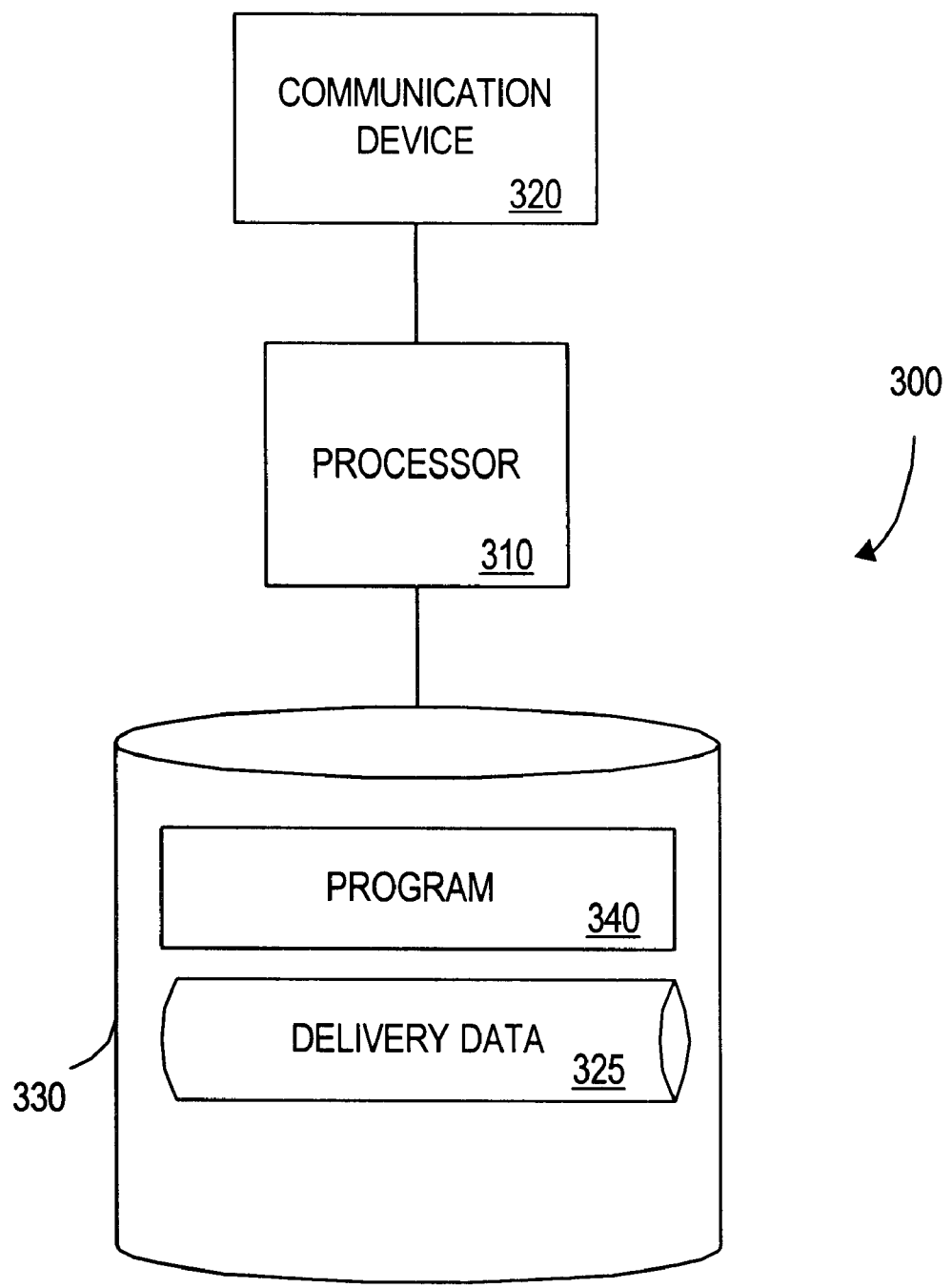
FIG. 3 is a block diagram of one embodiment of the user device depicted in FIG. 1.

FIG. 2 illustrates an embodiment of repository 200. In one currently-preferred embodiment, repository 200 includes both mechanical and electrical components. For example, repository may include a standard mail box or other receptacle to receive items such as mail, packages, or other delivered items. This mechanical component is depicted in FIG. 2 as container 270. Repository 200 also include electrical components which may be implemented as a remote computer, a dedicated hardware circuit, an appropriately programmed general purpose computer, or any other equivalent electronic, mechanical or electromechanical device that is adapted to perform the functions described herein. Some or all of the electrical components may be collocated with container 270. For example, as shown in FIG. 2, an access control device 260 and a sensor 250 are collocated with container 270, while the remaining electrical components may be located outside of the container or a distance away to prevent tampering.

Repository 200 comprises a processor 210, such as one or more Intel® Pentium® processors. Processor 210 is coupled to a communication port 220 through which processor 210 communicates with other devices, such as, for example, one or more user devices 300. Communication port 220 may include hardware and software facilitation communication with other devices using wired or wireless techniques, or a combination of different techniques. For example, communication port 220 may be one or more of: a network adapter, a modem, a Bluetooth chipset, etc.

Processor 210 is also in communication with sensor 250 adapted to determine whether an item has been placed into container 270. In some embodiments, sensor 250 may also identify the type, weight, size, shape, or identity of the item as well. A number of different sensors known to those skilled in the art may be used as sensor 250. For example, sensor 250 may be a bar code reader, a radio-frequency identification device (RFID) reader, a digital camera, a weight sensor, a strain gauge, a shock detector (such as an accelerometer), or an audio detector. The type of sensor or sensors used will determine the type of information may be sent to user device 300. For example, a bar code reader may result in the recording of and forwarding of detailed item information. A shock detector may simply result in an indication that an item has been deposited within container 270. A shock detector (such as an accelerometer) may result in notification of local authorities when the shock detector detects that container 270 is subject to a physical attack.

Combinations of more than one sensor may also be used. For example, in one embodiment, a weight sensor and a digital camera may be used together, where the weight sensor will first detect the presence of an item within container 270 and the digital camera will then take a photo of the item. This information may then be sent to one or more user devices 300. As another example, an audio recorder may be used in conjunction with one or more sensors to receive audio information from the individual making the delivery (e.g., the individual making the delivery may describe the delivered item in a recorded message, or leave some other recorded message for the recipient). In yet another example embodiment, the recipient, or the entity owning or operating repository 200 may leave a recorded message for the party making deliveries which will be played when a delivery is made.

Other types of sensors may also be used as sensor 250 to provide further details regarding an item within container 270. For example, individuals concerned about threats to them may utilize a bomb detector as sensor 250.

In some embodiments, processor 210 is also in communication with access control device 260 used to control access to the interior of container 270. For example, in some embodiments, it may be desirable to operate container 270 in a secure fashion and only allow certain permitted entities or individuals access to container 270. Alternatively, or in addition, it may be desirable to operate container 270 to keep a log of the individuals or entities who have accessed container 270. Access control device 260 may be, for example: a biometric reader, a personal identification number (PIN) reader, a magnetic stripe reader, a RFID reader, or a bar code reader.

Where container 270 is operated in a secure fashion, access control device 260 may include a locking mechanism which unlocks container 270 only when an authorized individual or entity correctly operates access control device 260 (e.g., enters the correct PIN, or presents an authorized RFID device to the reader, etc.). Access control device 260 may be configured, for example, to detect electronic attacks on container 270 (e.g., attempts to gain unauthorized access via electronic means), and to notify an individual or entity such as a law enforcement agency of the attempted attack.

In other embodiments, access control device 260 may allow access to all individuals, but will record information from each individual depositing an item into container 270 (e.g., a log of entities depositing items will be kept). In one embodiment, access control device 260 may simply detect the opening of repository 200. Those skilled in the art, upon reading this disclosure, will recognize that other suitable access control devices may also be used (e.g., a simple lock and key may also be used).

Processor 210 is also in communication with a data storage device 230. Data storage device 230 comprises an appropriate combination of magnetic, optical and/or semiconductor memory, and may include, for example, Random Access Memory (RAM), Read-Only Memory (ROM), a compact disc and/or a hard disk. Processor 210 and data storage device 230 may each be, for example: (i) located entirely within a single computer or other computing device; or (ii) connected to each other by a remote communication medium, such as a serial port cable, telephone line or radio frequency transceiver. In one embodiment, repository 200 may comprise one or more computers that are connected to a remote server computer for maintaining databases. Data storage device 230 stores a program 240 for controlling processor 210. Processor 210 performs instructions of program 240, and thereby operates in accordance with the present invention, and particularly in accordance with the methods described in detail herein. Program 240 may be stored in a compressed, uncompiled and/or encrypted format. Program 240 furthermore includes program elements that may be necessary, such as an operating system, a database management system and "device drivers" for allowing processor 210 to interface with computer peripheral devices. Appropriate program elements are known to those skilled in the art, and need not be described in detail herein.

According to an embodiment of the present invention, the instructions of program 240 may be read into a main memory from another computer-readable medium, such from a ROM to RAM. Execution of sequences of the instructions in program 240 causes processor 210 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

Data storage device 230 also stores data including, for example, delivery data 225 regarding items deposited within container 270. For example, data storage device 230 may store individual records identifying particular items which were deposited, including information about the delivery such as the time of deposit, the time of notification of one or more users 300, the identity of users notified, and/or any message left for the recipient or for the delivering party. The information identifying the particular items which were deposited may be as simple as an identification that an item was deposited, and may be more complex depending upon the type of data sensed by sensor 250. For example, if sensor 250 includes a digital camera, an image of the item may be stored in storage device 230. As another example, if sensor 250 includes a bar code scanner, the information scanned from the bar code of the item may also be stored in storage device 230. Other data may also be stored, for example, data from access control device 260 may be stored (e.g., repeated unauthorized accesses to container 270 may be stored, successful and authorized accesses may also be recorded). Some or all of the data stored in data storage device 230 may be forwarded to one or more user devices 300. For example, data may be packaged into an electronic mail message, a telephone message, a WAP message or some other format to be forwarded to one or more user devices 300 via communication device 220.

2. User Device

As mentioned above, user device 300 may be any of a number of different types of devices, including any suitable computing device. User device 300 may be operated by or on behalf of any of a number of different entities who are interested in receiving delivery information using embodiments of the present invention (e.g., including the individual recipient of an item, the party sending the item, the party delivering the item, etc.).

User device 300 comprises a processor 310, such as one or more Intel® Pentium® processors. Processor 310 is coupled to a communication port 320 through which processor 310 communicates with other devices, such as, for example, one or more repository(s) 200. Communication port 320 may include hardware and software facilitation communication with other devices using wired or wireless techniques, or a combination of different techniques. For example, communication port 320 may be one or more of: a network adapter, a modem, a Bluetooth chipset, etc.

Processor 310 is also in communication with a data storage device 330. Data storage device 330 comprises an appropriate combination of magnetic, optical and/or semiconductor memory, and may include, for example, Random Access Memory (RAM), Read-Only Memory (ROM), a compact disc and/or a hard disk. Processor 310 and data storage device 330 may each be, for example: (i) located entirely within a single computer or other computing device; or (ii) connected to each other by a remote communication medium, such as a serial port cable, telephone line or radio frequency transceiver. In one embodiment, user device 300 may comprise one or more computers that are connected to a remote server computer for maintaining databases.

Data storage device 330 stores a program 340 for controlling processor 310. Processor 310 performs instructions of program 340, and thereby operates in accordance with the present invention, and particularly in accordance with the methods described in detail herein. Program 340 may be stored in a compressed, uncompiled and/or encrypted format. Program 340 furthermore includes program elements that may be necessary, such as an operating system, a database management system and "device drivers" for allowing processor 310 to interface with computer peripheral devices. Appropriate program elements are known to those skilled in the art, and need not be described in detail herein.

According to an embodiment of the present invention, the instructions of program 340 may be read into a main memory from another computer-readable medium, such from a ROM to RAM. Execution of sequences of the instructions in program 340 causes processor 310 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software. Data storage device 330 may also store data, such as delivery data 325. Delivery data 325 may be the same as, or related to, delivery data 225 from the repository 200 as described in FIG. 2.

Process Description

Figure 4:
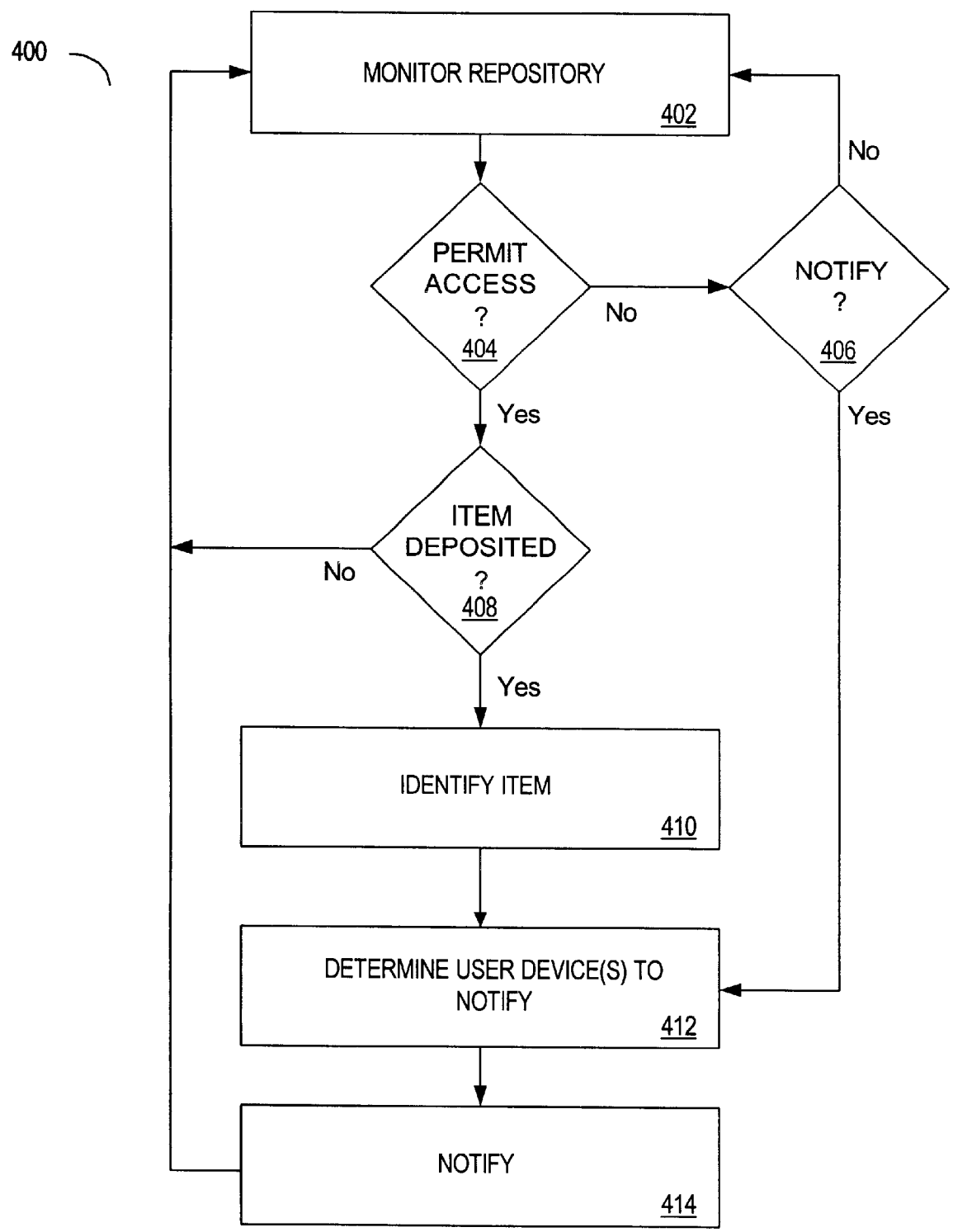
FIG. 4 is a flow diagram illustrating an exemplary process for notifying a recipient of a delivery according to an embodiment of the present invention.

Reference is now made to FIG. 4, where a flow chart 400 is shown which represents the operation of an embodiment of the present invention. The particular arrangement of elements in the flow chart of FIG. 4, is not meant to imply a fixed order to the steps; embodiments of the present invention can be practiced in any order that is practicable.

Processing begins at 402 where repository 200 functions to monitor itself by, for example, repeatedly operating sensor 250 and access control device 260 (as discussed above in conjunction with FIG. 2, not all embodiments of the present invention will utilize access control device 260). In some embodiments, sensor 250 and/or access control device 260 will notify processor 210 if a particular event monitored for occurs (e.g., access control device 260 may monitor for an attempt to open a door to container 270 while sensor 250 may monitor for placement of an item within container 270).

In embodiments which use access control device 260, processing may continue at 404 if access control device 260 indicates that there has been an access attempt. For example, if access control device 260 is a PIN reader or a PIN pad, a delivery person may attempt to access the interior of container 270 by entering a PIN number into a PIN pad of access control device 260. At 404, a determination is made whether access should be permitted (e.g., is the PIN number an authorized PIN number?). In some embodiments, a recorded message may be presented to the delivery person at this point.

If repository 200 determines that access should be permitted, processing continues to 408. If repository 200 determines that access should not be permitted, processing continues to 406 where a further determination may be made regarding whether or not to notify one or more user devices 300. For example, repository 200 may be configured to notify the owner or primary user of the repository if one or more failed attempts at accessing the interior of container 270 occur. In some embodiments, only certain types of unauthorized access attempts may be reported (e.g., more than three failed PIN entries in a short period of time). If a determination is made at 406 to notify one or more entities, processing continues to 412 where a determination is made regarding which user device(s) 300 to notify. Processing at 412 will be described below.

If a determination is made to permit access, processing continues to 408 (in embodiments where no access control device 260 is used, processing may proceed directly from 402 to 408) where a determination is made whether an item has been deposited within container 270. This determination may be made in a number of different ways, depending on the type of sensor 260 used. For example, if a weight sensor is used, the determination made at 408 will be to detect an item of some weight placed within container 270. If sensor 260 detects that an item has been deposited, processing continues to 410. If sensor 260 does not detect that an item has been deposited, processing loops back to 402 where the status of repository 200 continues to be monitored.

At 410, repository 200 may attempt to identify the item deposited. The extent of the identification can vary based on the configuration of repository 200 and the type of sensor 260 used. For example, if the sensor is a simple weight sensor, the identity of the item may simply be data indicating that an item of some weight (e.g., over one ounce) has been deposited. If the sensor is a combination of more than one type of sensor (e.g., a weight sensor and a digital camera), the identity may include more details (e.g., an item greater than one ounce has been deposited and a photograph of the item has been taken). In some embodiments, sensor 260 may extract more detailed information about the item. For example, a RFID reader used as sensor 260 may sense detailed package information (including an identity of the party sending the package, the date sent, etc.) from a package which includes an RFID transmitter in the packaging. The identity information received at 410 is stored in data storage device 230, e.g., as delivery data 225.

Once identity information regarding the item has been retrieved and stored, processing continues at 412 where a determination is made regarding which user device(s) 300 to notify. In some embodiments, only a single user device 300 is notified (e.g., where the owner of a particular mailbox may simply utilize features of the invention to receive notification of delivery of items). In other embodiments, multiple user devices 300 may be notified. The determination at 412 may be made using a number of different techniques. In one embodiment, the identity of the user devices 300 to be notified depends upon the identity information discerned at 410. For example, if processing at 410 indicates that the package was sent by AMAZON.COM® and delivered via FEDERAL EXPRESS®, the system may send a notification message to both AMAZON.COM® and FEDERAL EXPRESS®.

Once the appropriate user device(s) 300 are identified, processing continues to 414 where the appropriate user device(s) 300 are sent a notification message. This message may be sent in any of a number of different ways, including, for example, via electronic mail sent over a wired or wireless network or direct connection, via a telephone message, etc. For example, a repository 200 which has received a package may send a message to a user device 300 of the individual owning the repository simply indicating "A PACKAGE HAS BEEN RECEIVED AT hh:mm:ss of day/month/year". More detailed messages may be sent where further identity information has been discerned at 410. For example, a message indicating "A PACKAGE FROM AMAZON.COM WAS DELIVERED BY FEDERAL EXPRESS at hh:mm:ss of day/month/year". A wide variety of other types of messages may be provided to various entities using techniques of the present invention. Individual user devices 300 may specify notification preferences which are stored in individual repositories 200. In some embodiments, repository 200 may send additional notification messages to one or more user devices 300 (e.g., reminders that the package is still in the repository, etc.).

Processing returns to 402 where repository 200 continues to be monitored for further items and access attempts.

Although the present invention has been described with respect to a preferred embodiment thereof, those skilled in the art will note that various substitutions may be made to those embodiments described herein without departing from the spirit and scope of the present invention.

What is claimed is:

1. A notification method, comprising:

determining whether an item has been placed in a repository, wherein said determining comprises operating a sensor located in a container of said repository and wherein said sensor includes a video camera and a microphone;

identifying at least one entity to be notified; and notifying said at least one entity when said determining indicates that said item has been placed in said repository;

and wherein said notifying includes forwarding a picture and a sound recording to said at least one entity.

2. A notification method, comprising:

determining whether an item has been placed in a repository, wherein said determining comprises operating a sensor located in a container of said repository and wherein said sensor is an accelerometer adapted to detect a physical attack on said repository;

identifying at least one entity to be notified; and notifying said at least one entity when said determining indicates that said item has been placed in said repository; and notifying at least one entity when said repository is subject to said physical attack.

3. A notification method, comprising:

determining whether an item has been placed in a repository, wherein said determining comprises operating a sensor located in a container of said repository and wherein said sensor is adapted to detect a physical attack on said repository;

identifying at least one entity to be notified; and notifying said at least one entity when said determining indicates that said item has been placed in said repository; and notifying at least one entity when said repository is subject to said physical attack.

4. The notification method of claim 3, wherein said sensor is selected from at least one of: an accelerometer; a microphone; and a video camera.

5. A notification device, comprising:

a repository, for receiving an item;

sensor, coupled to said repository, for detecting the presence or non-presence of said item and for reading information about said item; and a communication device, coupled to said identification device, for transmitting a message to at least one entity when said identification device detects the presence of said item.

6. The device of claim 5 wherein said sensor is at least one of a RFID and a bar code reader.

* * * * *